UNITED STATES PATENT OFFICE.

RENÉ BOHN, OF LUDWIGSHAFEN, BAVARIA, ASSIGNOR TO THE BADISCHE ANILIN AND SODA FABRIK, OF MANNHEIM, GERMANY.

MANUFACTURE OF SOLUBLE NAPHTHAZARIN.

SPECIFICATION forming part of Letters Patent No. 368,054, dated August 9, 1887.

Application filed June 2, 1887. Serial No. 240,361. (Specimens.)

*To all whom it may concern:*

Be it known that I, RENÉ BOHN, a citizen of Switzerland, residing at Ludwigshafen, on the Rhine, in the Kingdom of Bavaria and Empire of Germany, have invented new and useful Improvements in the Manufacture of Soluble Naphthazarin, of which the following is a specification.

My invention relates to the manufacture of an improved dye-stuff or coloring-matter produced by the action of sulphites upon the coloring-matter discovered by Roussin in 1861, and originally described by him under the name of "Artificial Alizarin," (Chemical News, Vol. III, p. 329,) but which is now more properly called "naphthazarin," or, in chemical language, "dioxynaphthaquinone." (Watt's Dictionary of Chemistry, Vol. VII, 836.)

My improved dye-stuff or coloring-matter is termed "soluble naphthazarin," in order to indicate by this name both its origin and its principal difference from the known naphthazarin, a coloring-matter insoluble in water.

In carrying out my invention I take one hundred parts, by weight, of a paste containing twenty per cent. of dry naphthazarin, and I mix the same intimately with thirty-five parts, by weight, of a solution of bisulphite of soda, gaging from 1.357 to 1.383 specific gravity. This mixture is digested in closed vessels at a temperature ranging from about 50° to 70° centrigrade for about eight days, or until the coloring-matter has been rendered soluble in water, or nearly so. The product thus obtained is then ready for use.

In order to prepare my soluble naphthazarin in the mercantile form of a dry powder, its aqueous solution is either evaporated to dryness or it is saturated with common salt, whereby a precipitate is formed, which is then collected upon a filter, pressed, and dried. An analogous result is obtained by the employment of equivalent quantities of the bisulphites of potash or ammonia in the place of the above-named bisulphite of soda. The neutral sulphites of the alkali metals likewise effect a similar conversion of the naphthazarin into its soluble derivative.

The soluble naphthazarin obtained in the manner described presents the following characteristics: In the dry state it has the appearance of a dark-brown powder, which is readily soluble both in cold and hot water, and which can thus be distinguished from the original insoluble naphthazarin. Its aqueous solutions possess a brown color and exhibit a strong bluish-green fluorescence.

My new compound is characterized by its extreme stability in the presence of acids, while caustic or carbonated alkalies most readily effect its decomposition, naphthazarin being thus regenerated. The aqueous solutions of soluble naphthazarin resist even the action of boiling strong hydrochloric acid or of moderately-diluted sulphuric acid, whereas the addition of caustic soda in sufficient quantity to render the solutions alkaline rapidly, and even in the cold, develops a green color, which quickly changes into the blue color of alkaline naphthazarinates. Acid will then throw down naphthazarin. The same changes take place if a solution of soluble naphthazarin be boiled with an excess of carbonate of soda. The aqueous solution of soluble naphthazarin can be mixed with acetate of chrome or with analogous metallic mordants without suffering any decomposition; but upon impregnating cotton or similar vegetable fiber with such mixture and steaming the same naphthazarin will become fixed within the fiber in combination with the metallic base.

What I claim as new, and desire to secure by Letters Patent, is—

The improved dye-stuff or coloring-matter, termed "soluble naphthazarin," hereinbefore described, the aqueous solutions of which possess a brown color and exhibit a strong bluish-green fluorescence, said new compound being further characterized by its extreme stability in the presence of acids, while caustic or carbonated alkalies most readily effect its decomposition, as described.

In testimony whereof I have hereunto set my hand in the presence of two subscribing witnesses.

RENÉ BOHN.

Witnesses:
HEINRICH CARO,
FERDINAND PFEIFFER.